Aug. 11, 1931.  F. VARGO  1,818,366

AUTOMATIC HOOD LOCK

Filed June 23, 1930

Inventor

Frank Vargo

By

Attorney

Patented Aug. 11, 1931

1,818,366

UNITED STATES PATENT OFFICE

FRANK VARGO, OF TOLEDO, OHIO, ASSIGNOR OF ONE-HALF TO HILDA Y. ROTH, OF TOLEDO, OHIO

AUTOMATIC HOOD LOCK

Application filed June 23, 1930. Serial No. 462,989.

My invention has for its object to provide an efficient locking device for hood covers of automobiles and the like. The particular object of my invention is to provide a locking bolt on the louver section of the hood cover, which will engage fixed parts to prevent thievery or tampering with the parts contained under the hood. In the preferred form, the locking bolt is automatically operated by the door of the body of the car.

The invention may be contained in structures that vary in their details of construction and, to illustrate a practical application of the invention, I have selected one form of construction as an example of the different embodiments of the invention and shall describe it hereinafter. The lock selected, as an example, is shown in the accompanying drawings.

Figure 1:
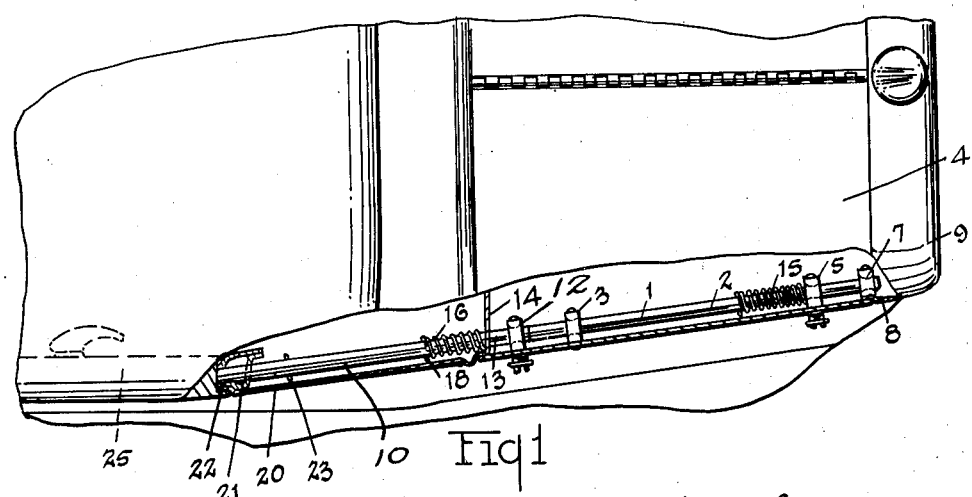
Figure 2:
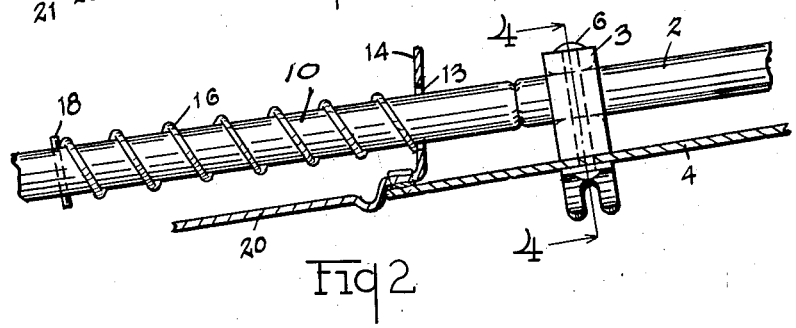
Figure 3:
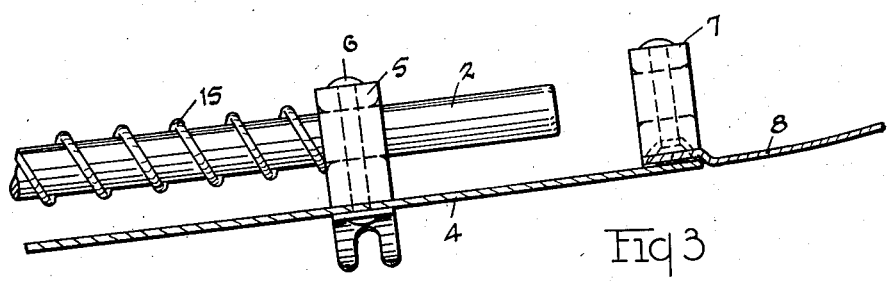
Figure 4:
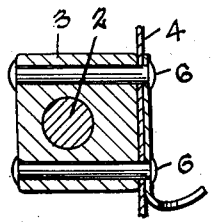

Fig. 1 is a perspective view showing a section of the hood cover and cowling broken away to illustrate the installed position of the lock. Fig. 2 illustrates the rear half of the locking means. Fig. 3 illustrates the front half of the locking means. Fig. 4 illustrates a view of a section taken on the plane of the line 4—4 indicated in Fig. 2.

In the form of construction shown, the hood lock 1 has a locking bar 2. The locking bar 2 is slidably supported in a pair of brackets 3 and 5. The brackets 3 and 5 are located in alignment with each other along the lower edge of the inside of each louver section of the hood cover 4 and may be attached thereto by bolts or rivets 6.

With this purpose in view, a locking socket 7 is placed in alignment with the bracket 5 on the flange 8 of the radiator 9 or some other relatively immovable supportive part on the automobile. The locking socket is similar in construction to the bracket 3 and is adapted to receive the end of the locking bar 2 when the bar is moved toward it.

In order to actuate the movement of the locking bar, a key bar 10 is located so that one of its ends makes contact with an end of the locking bar 2. The key bar 10 may be slidably supported in a bracket 12 and an opening 13 in the dash or cowl board 14. The bracket 12 is similar in construction to the bracket 3 and is located in alignment with the bracket 3 on the louver section of the hood cover 4. The bracket 12 is adapted to receive an end of the locking bar 2. It will be seen that when the key bar 10 is pushed forward with relation to the automobile, it will move through the opening 13 in the cowl board 14, and the bracket 12, and push before it the locking bar 2, which is guided by the brackets 3 and 5, to move its end into the locking socket 7 on the radiator 9. The hood cover 4 will then be held as against an opening movement by the end of the bar 2 in the socket 7 and the end of the key bar 10 in the bracket 12, located at opposite ends of the hood cover. To open the hood cover 4, the locking bar 2, and the key bar 10, must be returned to their initial position.

The locking bar 2 and the key bar 10 are caused to return to their initial unlocked position, preferably by the action of the spiral springs 15 and 16. The spring 15 is wound spirally about the locking bar 2 and located so that one of its ends abuts against the bracket 5 and the other end abuts against a pin, or button, 18, which may be located on the bar 2. The tendency of the spring 15 is to resist forward movement of the locking bar 2 and will be distorted when a force is applied to push the bar forward and in a locked position. When this force is removed, the locking bar 2 will be caused to return to its unlocked position by the action of the spring 15. Also a spring 16 is wound spirally about the key bar 10 and located so that one of its ends abuts against the dash or cowl board 14 about the opening 13, and the other end of the spring abuts against a pin or button 18, which may be located on the key bar 10. It will be seen that when the force, required to move the key bar 10 forward and in a locked position, is removed, the spring 16 will cause the return of the bar 10 to its unlocked position.

In order to provide for holding the key bar 10 and the locking bar 2 in their locked positions, and for automatically releasing the bars from such locked position, the key bar 10 may be extended inside and along the side panel 20 of the tonneau and through an opening 21 in the jamb 22 of the tonneau door 25. The opening 21 is substantially the same in diameter as the diameter of the key bar 10. The key bar 10 is limited on its outward movement with relation to the door jamb, by a pin or button 23 located on the bar 10, which will make contact with the edges of the opening 21 at the point of desired outward movement of the key bar 10. Therefore, when the tonneau door 25 is closed, its edge will push the key bar 10 forward against the tension of the spring 16 to a locked position. As the key bar 10 moves, it pushes before it the locking bar 2 against the tension of the spring 15 to a locked position. By opening the tonneau door, the contortion of the two springs 15 and 16 causes the return of the bars 10 and 2 to their initial unlocked position.

I claim:

1. In combination with a hood cover, a locking bar slidably supported on the hood cover, a key bar slidably supported on the hood cover and located to make contact with the end of the sliding bar, a socket adapted to receive an end of the locking bar, an elastic means for moving both bars relative to the socket.

2. In combination with an automobile hood cover, a bar slidably supported on the hood cover, a socket adapted to receive the bar, a key bar slidably supported in the cowl board of the automobile to make contact and move the first named bar into the socket to hold the hood cover as against an opening movement.

3. In combination with a hood cover, a bar slidably supported in a pair of brackets, the brackets being located in alignment at opposite ends of the hood cover, a key bar slidably supported in a third bracket on the hood cover in alignment with the first named brackets, a socket adapted to receive an end of the first named bar, and means for moving the key bar into one of the first named brackets to push the first named bar into the socket.

In witness whereof I have hereunto signed my name to this specification.

FRANK VARGO.